(12) United States Patent
Dittmann

(10) Patent No.: US 9,946,659 B2
(45) Date of Patent: Apr. 17, 2018

(54) NEAR-MEMORY ACCELERATOR FOR OFFLOADING POINTER CHASING OPERATIONS FROM A PROCESSING ELEMENT

(71) Applicant: International Business Machines Corporation, Armonk, NY (US)

(72) Inventor: Gero Dittmann, Zurich (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 193 days.

(21) Appl. No.: 14/941,960

(22) Filed: Nov. 16, 2015

(65) Prior Publication Data

US 2017/0139836 A1      May 18, 2017

(51) Int. Cl.
*G06F 12/00*          (2006.01)
*G06F 12/0897*     (2016.01)

(52) U.S. Cl.
CPC ...... *G06F 12/0897* (2013.01); *G06F 2212/60* (2013.01)

(58) Field of Classification Search
CPC .......................... G06F 12/0897; G06F 2212/60
USPC ......................................................... 711/118
See application file for complete search history.

(56) References Cited

U.S. PATENT DOCUMENTS 8,176,252 B1 *  5/2012  Alexander ............. G06F 13/28
                                                                  710/22
2004/0215891 A1 * 10/2004 Dodson ............... G06F 13/1694
                                                                  711/137

\* cited by examiner

*Primary Examiner* — Matthew Bradley
(74) *Attorney, Agent, or Firm* — Cantor Colburn LLP; Daniel Morris

(57) ABSTRACT

Embodiments include a near-memory acceleration method for offloading data traversal operations from a processing element. The method is implemented at a near-memory accelerator configured to interact with each of the processing element and a memory used by the processing element. The accelerator performs the data traversal operations to chase pointers, in order to identify a pointer to data to be processed by the processing element. The data traversal operations are performed based on indications from the processing element. In addition, data needed to perform the data traversal operations are fetched by the near-memory accelerator, from the memory. The present invention is further directed to a near-memory accelerator and a computerized system comprising such an accelerator, as well as a computer program product.

17 Claims, 4 Drawing Sheets

NEAR-MEMORY ACCELERATOR FOR OFFLOADING POINTER CHASING OPERATIONS FROM A PROCESSING ELEMENT

BACKGROUND

The present invention relates to information processing apparatus, an information processing method and program. The invention relates in general to the field of near-memory accelerators. In particular, it relates to pointer chasing operations performed by a processing element.

The concept of pointer chasing is known. A pointer is an object (data, variable), whose value refers to another value that is stored elsewhere in the memory, using the address of this other value. In other words, a pointer is a link that references a location in memory. A pointer may notably point to another pointer, and so on, such that multiple dereference operations may be required to retrieve the original value. Each level of indirection adds a performance cost.

Data structures of modern, e.g., object-oriented programming languages (such as Java, Python or C++) employ deep indirection for abstraction purposes (e.g., inheritance, containers such as lists or graphs). In addition to a program's data accesses, garbage collection (GC) frequently traverses all data structures in a program. Abstraction and GC make programmers more productive. However, for processors, the indirections translate to frequent pointer chasing, requiring it to pass through many different memory regions before arriving at the actual data to be processed.

As it may be realized, pointer chasing operations consume substantial bandwidth and cause memory cache pollution. Besides, one knows hardware accelerators, i.e., computer hardware that is capable of performing some specific functions faster than a general-purpose CPU.

SUMMARY

According to a one embodiment, the present invention is embodied as a near-memory acceleration method for offloading data traversal operations from a processing element. The method is implemented at a near-memory accelerator configured to interact with each of the processing element and a memory used by the processing element. The accelerator performs the data traversal operations to chase pointers, in order to identify a pointer to data to be processed by the processing element. The data traversal operations are performed based on indications from the processing element. In addition, data needed to perform the data traversal operations are fetched by the near-memory accelerator, from the memory.

Thus, exemplary embodiments make use of an accelerator that performs the traversal operations, where the processing element is typically inefficient. As a result of offloading the traversal operations, substantial bandwidth can be saved and cache pollution lowered. In addition, operands needed to complete the operations are appropriately fetched from memory. As a result, the present pointer chasing methods and devices can handle heterogeneous sequences of objects.

In one embodiment, the near-memory accelerator attaches to one level in the memory hierarchy of the memory used by the processing element. It may attach anywhere from the first-level of cache to the main memory. One configuration is where the accelerator connects to the last-level cache (e.g., the "L3" level), e.g., via a bus shared with the processing element.

According to another aspect, the invention is embodied as a near-memory accelerator, wherein the accelerator is configured to interact with each of the processing element and a memory used by the processing element. The accelerator is further configured to perform data traversal operations to chase pointers and identify a pointer to data to be processed by the processing element, based on indications from the processing element; and fetch data needed to perform the data traversal operations from the memory.

According to another aspect, the invention is embodied as a computer program product for offloading data traversal operations from a processing element, the computer program product comprising a computer readable storage medium having program instructions embodied therewith, the program instructions executable at a near-memory accelerator such as described above.

Computerized devices, systems, methods and computer program products embodying the present invention will now be described, by way of non-limiting examples, and in reference to the accompanying drawings.

BRIEF DESCRIPTION OF THE DRAWINGS

The accompanying drawings show simplified representations of devices, systems or parts thereof, as involved in embodiments. Similar or functionally similar elements in the figures have been allocated the same numeral references, unless otherwise indicated.

DETAILED DESCRIPTION

As outlined in introduction, pointer chasing requires for the processor to pass through several different memory regions before arriving at the actual data it needs to process. As it can be realized, substantial processing resources are needed during the traversal operations to follow a pointer to a data structure and interpret the data structure to find the next pointer to follow. For this, a processor typically loads each data structure into the cache, whereas all what it really needs is the data structure as obtained at the end of the traversal.

As it can further be realized, pointer chasing makes little use of the processor's computational power but consumes bandwidth in the memory hierarchy and puts pressure on the caches, leading to frequent cache misses that slow down the entire system. Garbage collection, big data and graph analytics workloads, in particular, lead to significant cache pollution with infrequently accessed data.

As the present inventor realized, substantial bandwidth could be saved and cache pollution avoided if traversal operations were done in- or close to memory. Better performance would be attained if only the data structure (or its address), as needed at the end of the traversal operations, were delivered to the processor. The solutions accordingly devised by the present inventors are explained in detail below. The following description is structured as follows.

Figure 1:
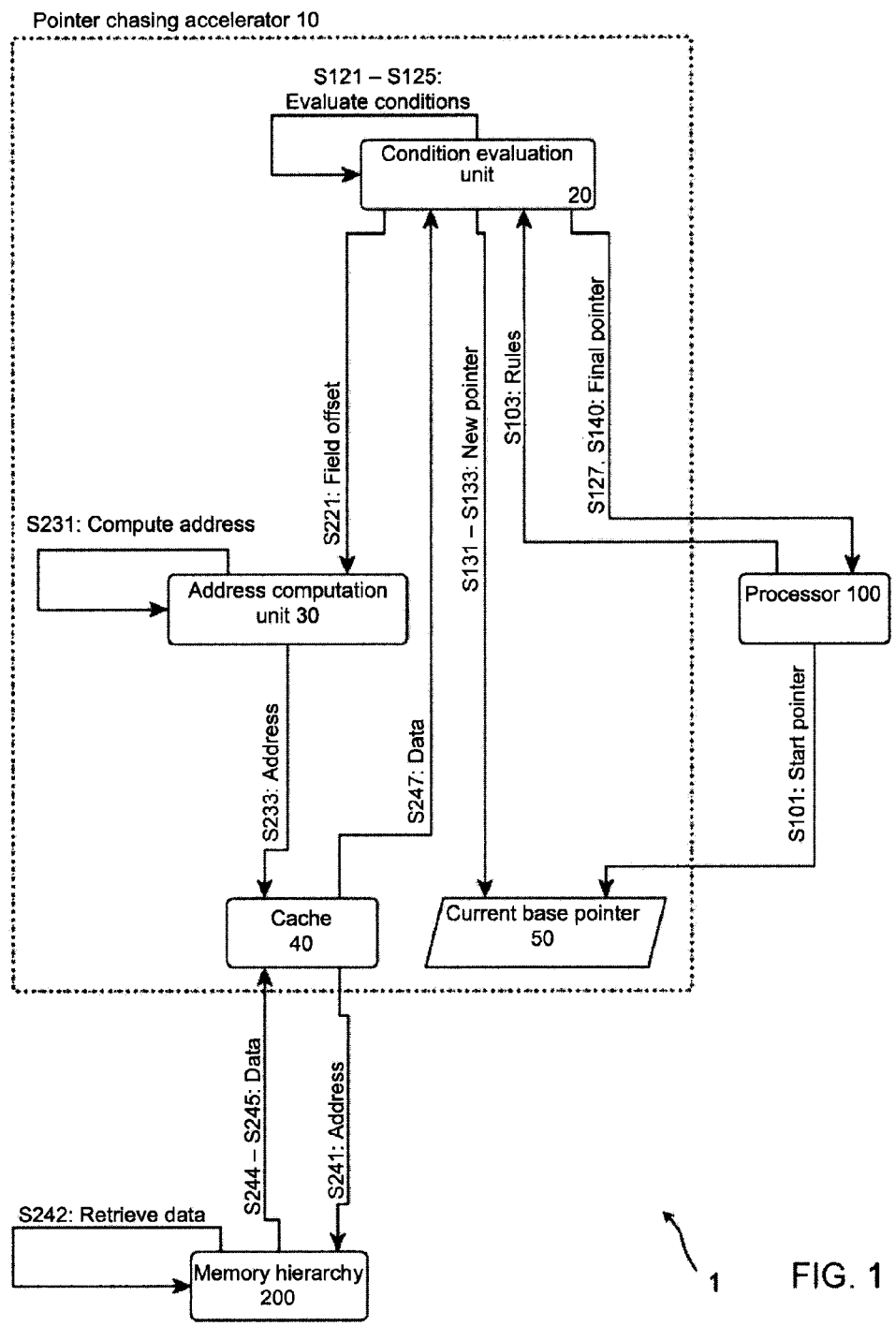
FIG. 1 schematically represents a computerized system, including a near-memory accelerator, according to embodiments of the invention.
Figure 2:
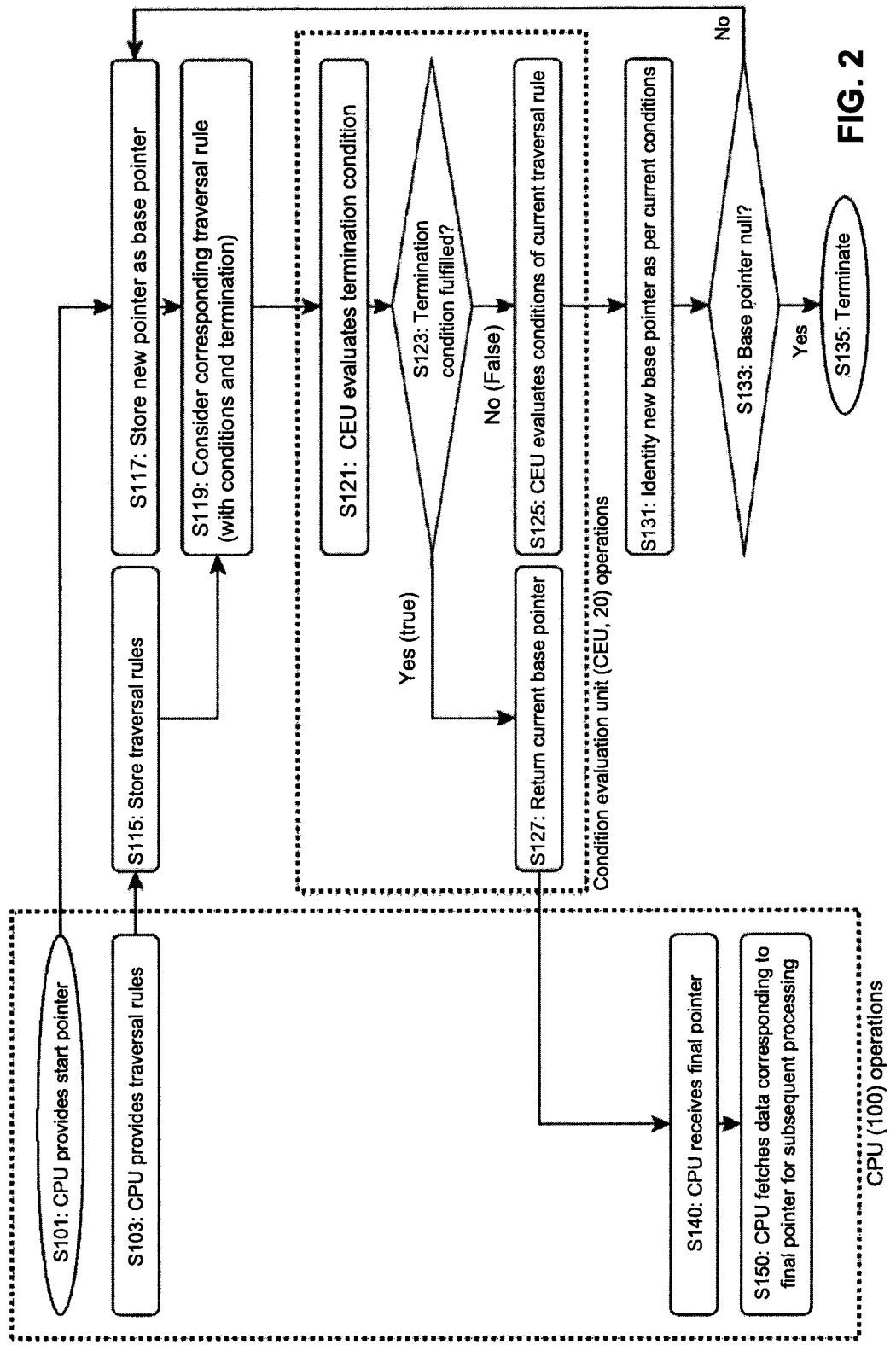
FIG. 2 is a flowchart illustrating high-level steps of a method for offloading pointer chasing operations from a processing element, as in embodiments.

In reference to FIGS. 1 and 2, an aspect of the invention is first described, which concerns a near-memory acceleration method for offloading data traversal operations from a processing element 100. The method is implemented at a near-memory accelerator 10, e.g., a hardware device located in- or close to a memory used by the processing elements. A near-memory accelerator makes the memory "active", whereby computation that is otherwise typically handled by a processor is performed within, or in close proximity with the memory system. Performance can accordingly be improved as the processing may benefit from dedicated hardware (specialized for the outsourced operations), in proximity with the data needed, such that data need not be moved across interconnects from memory to processor. As such, a near-memory device requires a suitable interface to interact with the memory.

In the present case, the accelerator 10 is in fact configured to interact with each of the processing element 100 and the memory 200 used by the processing element 100. However, since most exchanges it incurs involves the memory 200, the hardware component is designed as a near-memory component. The accelerator 10 takes care of data traversal operations S117-S133, as normally needed to chase pointers. Performing such operations eventually allows a pointer to data to be processed by the processing element 100 to be identified.

The data traversal operations are performed based S101-S103 on indications from the processing element 100, which are discussed in detail below. In addition, data (e.g., operands) needed to complete the data traversal operations are fetched S241-S247 by the near-memory accelerator 10, from the memory 200, that is, when needed, e.g., on the fly. Accordingly, not only pointer chasing operations can be offloaded from the main processing element but, in addition, the accelerator is not confined to a particular, pre-determined data structure. On the contrary, here the accelerator can adaptively handle different types of data structure, based on indications as provided by the processing element. The data needed to complete traversal operations are, e.g., fetched on demand.

The processing element 100 may include one or more processors, e.g., a CPU, as discussed in embodiments below. The present pointer chasing solution relies on an accelerator that concentrates on the traversal operations, where the processing element is typically inefficient. The accelerator will otherwise leave normal compute operations to the processing element, for which the processing element is normally optimized. Moreover, although the accelerator reads from memory it does not need to write to memory, which—it can be realized, simplifies the required memory interface for the accelerator. As a result of the offloaded traversal operations, substantial bandwidth can be saved and cache pollution lowered. Traversal operations are efficient as they are performed in- or close to the memory.

Note that, although the processing element 100 outsources pointer chasing operations it remains somehow in control as it provides the necessary indications. This way, only the processing element 100 need be made "aware" of the near-memory accelerator 10 capability (i.e., the program instructions otherwise executed by the processor need not). The accelerator 10 need be suitably interfaced to the memory 200. In this respect, the accelerator 10 attaches to only one level in the memory hierarchy of the memory 200 used by the processing element 100, i.e., it may attach anywhere from the first-level of cache to the main memory.

Figure 4:
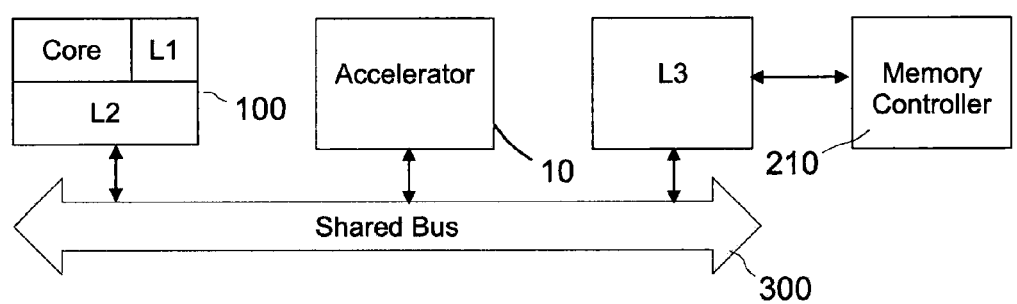
FIG. 4 is a diagram illustrating a processor core and a near-memory accelerator connected to a last-level cache of memory via a shared bus, according to embodiments.
Figure 5:
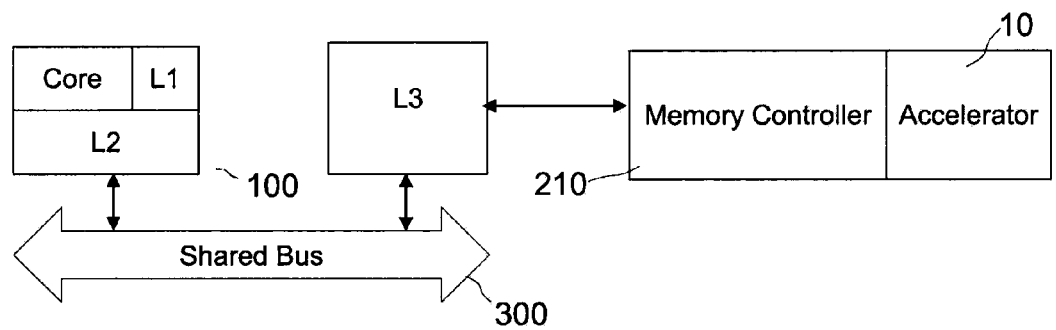
FIG. 5 is a diagram illustrating a variant to FIG. 4, where the near-memory accelerator is integrated in a memory controller, according to embodiments.

An exemplary configuration is one where the accelerator connects to the last-level cache (or LLC) on the chip (e.g., the "L3" level), for simplicity, i.e., in the same way as processor cores do, that is, via a shared bus 300 (FIG. 4). On this bus, the cores and accelerator would typically be masters and the LLC is a slave. Yet, one may want to place the near-memory accelerator closer to the memory, by integrating it with the memory controller 210 (on or off chip, as illustrated in FIG. 5). In FIGS. 4 and 5, the memory controller is assumed to connect directly to the L3 level and not to the shared bus (although it may do so, in variants), it being noted that the processor cores will typically only access the main memory through the L3. Many other architectures can be contemplated, as the one skilled in the art may appreciate. In particular, another option is to have the accelerator share a cache closer to a core, e.g., the "L2" cache level, via a multiplexer and an arbiter. The closer the accelerator to the memory, the larger the gain, in principle.

Next, not all the pointer chasing operations need be offloaded from the processing element. For instance, the processing element (or a controller) may be designed to dynamically "decide", e.g., based on a current utilization, whether to outsources pointer chasing operations or not. Preferably though, all the sequence of operations are systematically offloaded, so that the above process completes as follows: when a final pointer (a pointer to the data to be processed in fine by the processing element 100) is identified S131, upon completion S123 of the data traversal operations, the final pointer (or even data pointed at) is returned S127 to the processing element 100, for subsequent processing S140, S150 (FIG. 2). In that case, better performance can be achieved for the processing element as only the final data structure (or its address), as needed at the end of the traversal operations, is delivered to the processing element.

The needed indications are sent S101, S103 by the processing element 100 itself, prior to performing the data traversal operations. Such indications may for instance comprise a start base-pointer and traversal rules on which pointers to follow while performing the traversal operations. In variants, the rules are not provided as such. Rather, access to the rules is enabled by sending a pointer thereto.

In one embodiment, each rule comprises candidate pointers, as well as conditions to select one of the candidate pointers. The candidate pointers may be given by value in the rule. Preferably, they are passed as offsets from the base pointer, which offsets specify a field in the object the base pointer points to. Rule operands may also be given by value or as offsets. The condition may further include a termination condition, to ensure a correct termination once the final pointer has been found.

The data traversal operations are performed using comparison operators and operands contained in the conditions of the rules. Examples are given below. The accelerator may accordingly comprise a suitable logic unit 20 to perform the operations, thanks to operators contained in the conditions, whereas operands can be appropriately fetched from memory. As a result, the present pointer chasing methods and devices are generic, inasmuch as they can work independently from a particular data structure, and can handle heterogeneous sequences of objects where each object may be of a different type.

For example, a traversal rule as received at the accelerator 10 (block S115, FIG. 2) may comprise a set of data fields, where each data field is specified as an offset from a base pointer. The data fields will notably comprise operands. Each operand required for completing a traversal operation can be fetched from memory, e.g., on the fly. The data fields further contain at least one candidate pointers, which may potentially be selected as a next base-pointer. A traversal rule also includes a condition for each candidate pointer of the rule. The conditions are designed, as a whole, so as to allow a next candidate pointer to be identified (i.e., and then selected as a new base pointer), or a final base-pointer to be identified (and then returned as a final pointer).

Comments are in order: a field may contain an operand or a candidate pointer. A distinction should be made between (i) an object field identified by an offset to the base pointer and (ii) conditions and consequences that make up a rule. A rule may for instance comprise a list of condition-consequence pairs, whereby a condition, if evaluated to 'true', triggers an associated consequence. A condition typically consists of operators (comparison or logic) and their operands (by value [immediate] or offset from the base pointer). Possible consequences are a new base pointer, or termination, or both, as explained below. As noted earlier, a new base pointer shall be retrieved from a data field, as an offset from the current base pointer. In one embodiment, there will always be a default consequence at the end of each rule ('else' branch in the examples below). Also, while a termination condition shall typically be separate from a traversal rule, termination can be addressed as discussed just above. A termination condition may or may not depend on the chosen candidate pointer.

Let's consider a practical example, assuming two different types of (simplified) data structure only, for simplicity. A first set of data fields may be of the type: {{A},{b},{C}}, the corresponding condition-consequences being {IF b==5, A, C}, and a second set of data fields may be of the type: {{D},{e},{f},{G}}, with corresponding condition-consequences {IF e<f, D, G}, where majuscules and minuscules symbolically denote pointers and operands, respectively. In the first case, {A}, {b} and {C} are fields of the object the base pointer points to, whereas {IF b==5, A, C} represents a structure aggregating a condition (IF b==5), a consequence (A if condition is evaluated to True) and a default consequence (C, if evaluated to False). Thus, the first rule stipulates that pointer A should be followed if b is evaluated to be equal to 5 (integer number), else pointer C should be followed. The second rule above uses two operands; the condition stipulates here that pointer D should be followed if e is evaluated to be less than f (as evaluated), else pointer G should be followed. Each operand can be specified as an offset from a current base-pointer and be evaluated by suitably fetching a corresponding value from memory. Of course, real data structures may be (much) longer and complex. Additional fields may be provided to indicate which field is to be evaluated directly, which fields corresponds to addresses, as necessary.

To summarize, conditions comprise operators (e.g., comparison or logical operators) and involve operands (e.g., immediate values or base-pointer offsets). Multiple conditions, each paired with a consequence (and possibly augmented with a default consequence), form a rule. A list of rules, which can be regarded as a pointer-chaser "program", is provided at block S103, typically as a pointer to the memory location of the relevant program.

As evoked earlier, in embodiments, a traversal rule as received at block S115 comprise a default consequence, i.e., a condition imposing to select S123 a given candidate pointer if no other condition of the rule is fulfilled. For example, a rule may have the form {IF e<10, D, {IF e<f, G, H}}, assuming that corresponding data fields {{D},{e},{f}, {G}} are passed along. I.e., if e is found to be less than 10, then D should be followed, else, if e is found to be less than f, then G should be followed. Else (i.e., if none of the previous conditions was found to be met), H should be followed.

In addition, terminations conditions may be provided. Note that a default consequence is exercised if none of the previous conditions is evaluated to 'True', whereas a termination condition determines when the pointer traversal ends. An example of termination condition is {IF a<5, Terminate], assuming that a (or a corresponding offset to the base pointer) is passed along. Because of the 'Terminate' instruction, the process stops and a current base-pointer will be returned.

Data traversal operations are typically performed iteratively, i.e., for each current base-pointer 50. Each iteration of the data traversal operations may for instance comprise the following operations, which are performed while evaluating S119 a current rule, i.e., a rule relevant to a current base-pointer 50. First, a termination condition is evaluated S121 (e.g., if each of b and c is less than 20, then terminate and return the current base-pointer). I.e., if S123 the termination condition is fulfilled, then the current base-pointer is returned S127 to the processing element 100. Else, other conditions from the current traversal rule will be evaluated S125 to identify S131 a candidate pointer as a new current base-pointer, which triggers S117 a next iteration of the data traversal operations.

The rules are already suitably ordered as they are received at the accelerator 10, as per logic of the entity requesting instructions to be executed at the processing element. Typically, traversal rules are incremented at each iteration, such that a rule relevant to a current base-pointer can automatically be identified, at each iteration, as a current rule.

In one embodiment, the data traversal operations are performed iteratively until no new current pointer can be selected (because a termination condition is met), in which case a last identified candidate pointer (i.e., the current base-pointer) is returned S127 to the processing element 100, e.g., as per a termination condition S121 of a current rule or, even, as a general termination condition. In that respect, it is reminded that a termination condition may be provided independently from the rules. Then, the processing element 100 may, upon receiving S140 a final pointer, access S150 corresponding data in memory 200, for subsequent processing.

Figure 3:
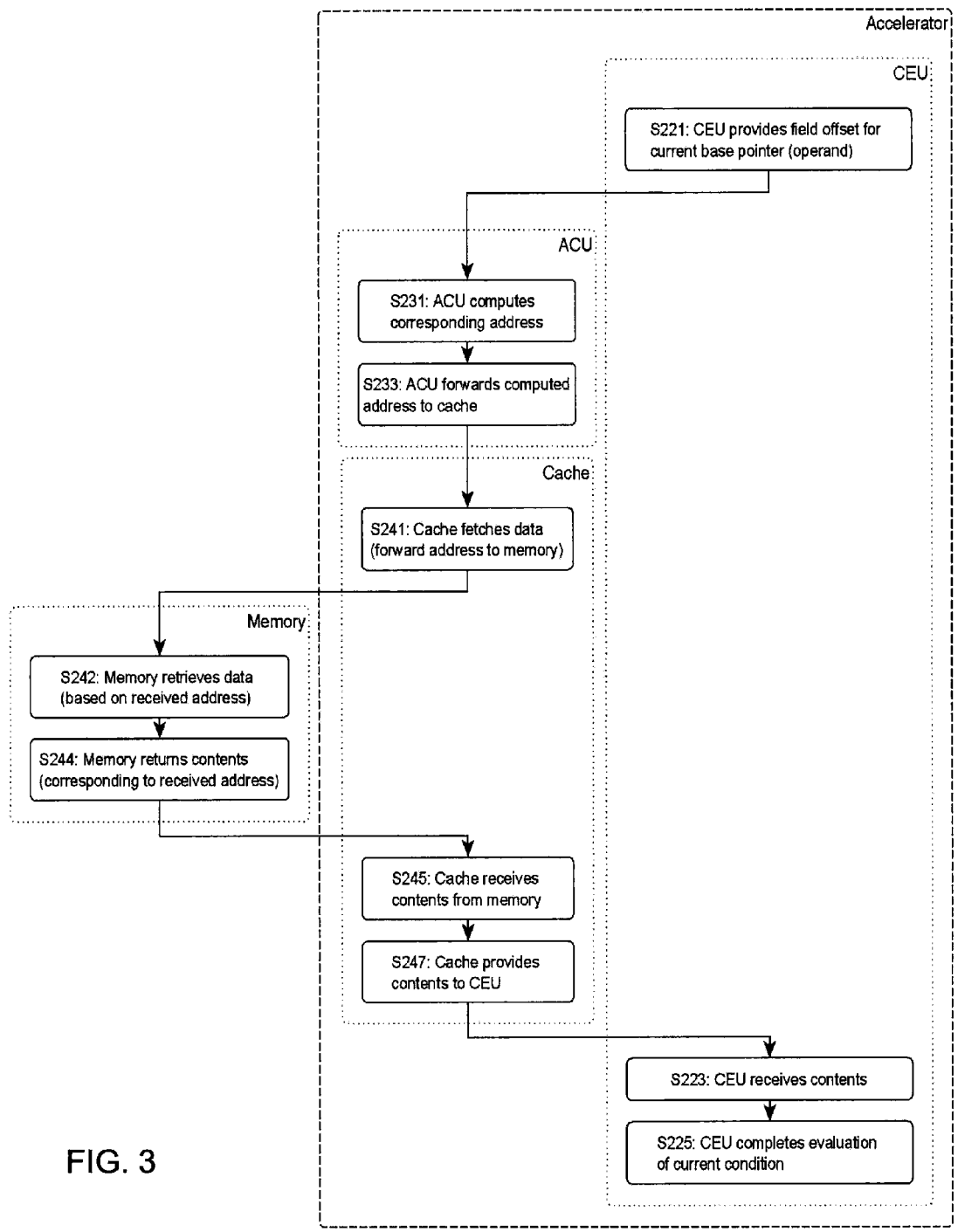
FIG. 3 is a flowchart illustrating high-level steps of a method for evaluating conditions to identify a new base-pointer (during traversal operations), as involved in embodiments.

Referring now to FIG. 3: as evoked above, contents corresponding to a data field (as needed at any iteration of the data traversal operations) may be retrieved by the accelerator 10 by simply adding S231 an offset corresponding to this data field to a current pointer 50 to obtain an address and, then, the needed contents may be fetched S233-S245 from memory 200, using the obtained address.

As illustrated in FIG. 1, contents fetched from the memory 200 are cached in a cache memory 40 of the accelerator 10, to speed up operations at the accelerator. In one embodiment, the cache 40 is a register-based cache. According to another aspect, the invention can be embodied as a near-memory accelerator 10, i.e., a hardware component, which can be connected with each of a processing element 100 and a memory 200 used by the processing element 100, to interact therewith and perform data traversal operations, based on indications from the processing element 100. A simple example of architecture for such an accelerator is illustrated in FIG. 1, together with some of the operations it performs.

Traversal operations cause the accelerator to chase pointers, so as to offload such operations from the processing element). Eventually, a final pointer will be identified and returned to the processing element 100, according to methods as described above. As described earlier, the accelerator is configured to fetch any data it needs during the performance of traversal operations, from the memory 200.

Consistently with the present methods, the accelerator 10 may advantageously comprise a cache memory 40, so as to cache data fetched from memory 200 in this cache memory 40, e.g., a register-based cache (not to be confused with the cache memory L1, L2, . . . used by the processing element 100). In addition, the accelerator 10 may further comprise a condition evaluation unit 20, which is connected to the cache memory 40, so as to be able to evaluate conditions provided by the processing element 100 as part of the indications. Thus, the accelerator 10 will chase pointers, based on data fetched from the memory 200 and as subsequently cached in the cache memory 40. The accelerator 10 may also comprise an address computation unit 30, connected to the condition evaluation unit 20, so as to receive field offsets from the latter. The computation unit 30 is dedicated to address computation tasks, i.e., it is configured to compute addresses from field offsets as received from the condition evaluation unit 20. The computation unit 30 will further be connected to the cache 40 to forward computed addresses thereto.

Still referring to FIG. 1, according to another aspect, the invention can be embodied as a computerized system 1, comprising the accelerator 10 of claim 13 and a memory 200, i.e., a memory as used by a processing element 100. The accelerator may be an add-on component, which can be interfaced with a given level of memory in the memory hierarchy, so as to read contents from this level of memory, as illustrated in FIG. 4. It can further be built as part of the memory controller 210 (FIG. 5) or even as part of the main memory, so as to make the memory 200 an active memory. In embodiments, the system 1 may further comprise a processing element 100, with which both the memory 200 and the accelerator 10 interacts.

One embodiment is now discussed in reference to FIGS. 1, 2 and 3. The near-memory accelerator attaches to one level in the memory hierarchy, anywhere from the first-level cache to main memory. This level is fixed at design time. The processing element 100 passes S101 to the accelerator 10 a start base-pointer (stored as current base-pointer 50) to the object where traversal must start along S103 with a succession of conditions, i.e., traversal rules on which pointers to follow and termination conditions. At the end of the traversal, the accelerator returns S127 a pointer to the final object.

The conditions involves comparison operators (e.g., ==, >, <, >=, <= and !=, using typical notations for operators in C and C++) and their operands. The operands can be either immediate values or fields in the current data structures, specified as an offset from the base-pointer. An operand could also be a set of immediates or fields, specifying a condition that any out of a set of fields matches an immediate, that a field matches any out of a set of immediates, or a combination thereof.

A traversal rule includes a set of data fields (each specified again as an offset from the base-pointer) containing candidate pointers to follow, i.e., pointers that might become the next base-pointer and a condition for each candidate pointer but the last, based on which one of the candidates is selected. The last pointer is the default—selected if all other conditions of that rule are false. The simplest cases are a single condition that selects between two candidate pointers, or the unconditional case with only a single candidate pointer. A condition can notably be specified as a comparison on a data field, as an iteration count, or as a constant (true or false). The iteration count enables easy traversal of homogeneous data structures such as a linked list. There is an implicit test S133 (FIG. 2) for null pointers in each iteration, such that, upon finding one, terminates the traversal and returns null (the error is normally managed by the program being executed at the CPU). At each iteration, the condition-evaluation unit (CEU) 20 evaluates a current termination condition. If true, the accelerator returns S127 the current base-pointer to the CPU. If false, the CEU evaluates S125 the current traversal rule and stores S117 the resulting S131 new base-pointer 50. If S133 the new base-pointer is null the process terminates S135. Otherwise, it continues with the next iteration S117, S119, Any data fields needed by the CEU (operands or pointers) during block S125 are retrieved by adding S221-S231 their offset to the base-pointer 50 in the address computation unit (ACU) 30 and passing S233 the resulting address to a mini-cache 40. In turn, the cache 40 fetches S241-S245 the data from the memory hierarchy, if and where necessary, and delivers S247 the field content to the CEU. As it can be realized, pointer chasing operations do not exhibit much data locality, the mini-cache 40 is designed so as to be small but fast, e.g., register-based. At the end S223-S225 of this process (S125), the CEU returns S127 a final base-pointer, which the CPU receives S140. This pointer points at the data structure that the CPU was initially looking for and can access S150 it through the regular memory hierarchy, for subsequent processing. The process can be repeated for each pointer chasing operations.

Note that, since the operators are an integral part of the rules and that the latter typically reside in memory, what the processor provides at block S103 is a pointer to the first rule in memory. Upon receiving such a pointer, S103, FIG. 1, the CEU 20 may then access the rules through the cache 40, just as it does with data. When it retrieves the rules it will find the operators directly embedded in the rules.

Next, and according to a final aspect, the invention can be embodied as a computer program product for offloading data traversal operations from a processing element. The computer program product comprises a computer readable storage medium having program instructions embodied therewith. Such instructions are executable at a near-memory accelerator such as described herein. Program instructions cause the near-memory accelerator to perform data traversal operations, as discussed above.

Thus, the present invention may be embodied as a device (an accelerator), a system (comprising this accelerator, e.g., an active memory), an acceleration method and a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, etc.

The computer readable program instructions will typically execute entirely on the accelerator. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A near-memory acceleration method for offloading data traversal operations from a processing element at a near-memory accelerator configured to interact with each of the processing element and a memory used by the processing element, the method comprising:

performing the data traversal operations to chase pointers, in order to identify a pointer to data to be processed by the processing element, wherein, the data traversal operations are performed based on indications from the processing element; and data needed to perform the data traversal operations are fetched by the near-memory accelerator, from the memory, wherein performing the traversal operations comprises:
identifying said pointer to data to be processed by the processing element upon completion of the data traversal operations performed wherein the data traversal operations are performed iteratively until no new current pointer can be selected, in which case a last identified candidate pointer is returned to the processing element; and
returning to the processing element said last identified candidate pointer or said data to be processed by the processing element, and
wherein the near-memory accelerator is located in the memory used by the processing element.

2. The method of claim 1, further comprising, prior to performing the data traversal operations:
receiving the indications from the processing element, which indications comprise:
a start base-pointer; and access to traversal rules on which pointers to follow while performing the traversal operations, each of the rules comprising candidate pointers; and conditions to select one of the candidate pointer, the condition including a termination condition.

3. The method of claim 2, wherein the data traversal operations are performed using comparison operators and operands contained in the conditions of the rules.

4. The method of claim 2, wherein a traversal rule received at the accelerator comprises:
a set of data fields, each of the data fields specified as an offset from a base-pointer, the data fields containing at least one candidate pointers; and
a condition for each candidate pointer of said traversal rule, the conditions designed as a whole so as to allow for identifying a candidate pointer of said traversal rule.

5. The method of claim 4, wherein the traversal rule received further comprises a default consequence, the latter imposing to select a given candidate pointer if no condition of said rule is fulfilled.

6. The method of claim 5, wherein the data traversal operations are performed iteratively, for each current base-pointer, and wherein, an iteration of the data traversal operations comprises, while evaluating a current rule that is relevant to a current base-pointer comprises:
evaluating a termination condition; and
if the termination condition is fulfilled, then returning the current base-pointer to the processing element, else evaluating other conditions from the traversal rule to identify a candidate pointer as a new current base-pointer, so as to trigger a next iteration of the data traversal operations.

7. The method of claim 6, wherein the method further comprises, at the processing element, upon receiving the last selected candidate pointer, accessing corresponding data in the memory of the processing element.

8. The method of claim 6, wherein contents corresponding to a data field as needed at an iteration of the data traversal operations is retrieved, by the accelerator, by:

adding an offset corresponding to this data field to a current pointer to obtain a new address; and fetching contents corresponding to the new address from the memory.

9. The method of claim 8, wherein contents fetched from the memory are cached in a cache memory of the accelerator.

10. The method of claim 1, wherein the near-memory accelerator is configured to interact with each of the processing element and one level of memory in a memory hierarchy of the memory used by the processing element, and wherein, data needed to perform traversal operations are fetched by the near-memory accelerator, from said one level of memory.

11. A near-memory accelerator, wherein the accelerator is configured to:
interact with each of a processing element and a memory used by the processing element;
perform data traversal operations to chase pointers and identify a pointer to data to be processed by the processing element, based on indications from the processing element; and
fetch data needed to perform the data traversal operations from the memory,
wherein performing the traversal operations comprises:
identifying said pointer to data to be processed by the processing element upon completion of the data traversal operations performed wherein the data traversal operations are performed iteratively until no new current pointer can be selected, in which case a last identified candidate pointer is returned to the processing element; and
returning to the processing element said last identified candidate pointer or said data to be processed by the processing element, and
wherein the near-memory accelerator is located in the memory used by the processing element.

12. The accelerator of claim 11, wherein the accelerator further comprises a cache memory; and the accelerator is further configured to cache data fetched from the memory in the cache memory.

13. The accelerator of claim 12, wherein the cache memory of the accelerator is a register-based cache memory.

14. The accelerator of claim 12, wherein the accelerator further comprises a condition evaluation unit, the latter connected to the cache memory of the accelerator and configured to evaluate conditions provided by the processing element as part of said indications, to chase pointers, based on data fetched from the memory as cached in the cache memory of the accelerator.

15. The accelerator of claim 14, wherein the accelerator further comprises an address computation unit, wherein the address computation unit is:
connected to the condition evaluation unit to receive field offsets from the latter;
configured to compute addresses from field offsets received from the condition evaluation unit; and connected to the cache memory of the accelerator to forward computed addresses thereto.

16. A computerized system, wherein the system comprises the accelerator of claim 11 and said memory.

17. A computer program product for offloading data traversal operations from a processing element, the computer program product comprising a computer readable storage medium having program instructions embodied therewith, the program instructions executable at a near-memory accelerator, the latter configured to interact with each of the processing element and a memory used by the processing element, to cause the near-memory accelerator to perform the data traversal operations to chase pointers and identify a pointer to data to be processed by the processing element, wherein, the data traversal operations are performed based on indications from the processing element and data needed to perform the data traversal operations are fetched by the near-memory accelerator, from the memory,
  wherein performing the traversal operations comprises:
    identifying said pointer to data to be processed by the processing element upon completion of the data traversal operations performed wherein the data traversal operations are performed iteratively until no new current pointer can be selected, in which case a last identified candidate pointer is returned to the processing element; and
    returning to the processing element said last identified candidate pointer or said data to be processed by the processing element, and
  wherein the near-memory accelerator is located in the memory used by the processing element.

* * * * *